May 7, 1929.   H. D. DOUCETT ET AL   1,711,928
LATH CLIP
Filed June 29, 1927

Harry D. Doucett
George S. Gardner
INVENTORS

BY *Victor J. Evans*
ATTORNEY

WITNESS:

Patented May 7, 1929.

1,711,928

UNITED STATES PATENT OFFICE.

HARRY D. DOUCETT AND GEORGE S. GARDNER, OF SAN DIEGO, CALIFORNIA.

LATH CLIP.

Application filed June 29, 1927. Serial No. 202,382.

This invention relates to clips for metal lathing, the general object of the invention being to provide a clip having an eye for receiving a nail and which acts to space the lathing the proper distance from the supporting member, with means for locking portions of the lathing to the nail. This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 4:
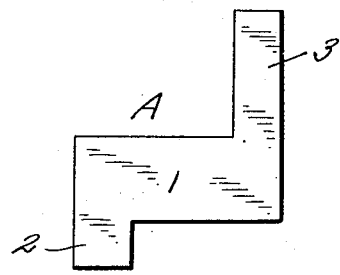
Figure 4 is a view of the blank from which the clip is formed.

As shown in Figure 4, the clip is formed of a substantially Z-shaped blank A which is composed of the wide part 1, the short arm 2 and the long arm 3, the arms being on opposite sides of the part 1 and at opposite ends thereof. The part 1 is bent upon itself to form the eye 4 which receives the nail 5. Then the arm 2 is bent at right angles to form the base 6 and the arm 3 is bent upon itself with its free end overlapping the part 1 to form the upstanding locking member 7 which is engaged by the head of the nail when the nail is driven home and which locks a part of the lathing between itself and the nail.

Figure 1:
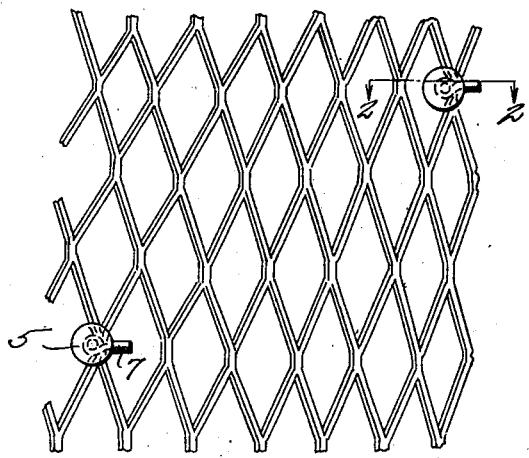
Figure 1 is a view showing how the clips are used with the lathing.
Figure 2:
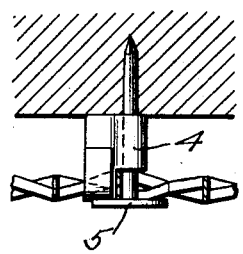
Figure 2 is a section on line 2—2 of Figure 1.
Figure 3:
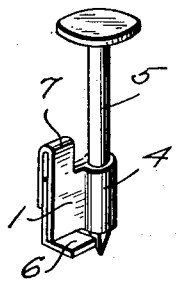
Figure 3 is a view of the clip and nail placed together.

Thus this clip not only acts to hold the lathing in spaced relation from the supporting members into which the nails are driven, but it also acts as a stop to prevent the nail from being driven too far into the supporting member and it also acts to lock parts of the lathing between itself and the nail, as shown in Figure 2. As will be seen, the part of the clip which is engaged by the head is of considerable strength as it is formed of several thicknesses of the blank so that this part can take the blows of the hammer used to drive the nail into the supporting member without damage to the clip. This clip can be put in place by one hand, thus leaving the other hand free to use the hammer.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

A clip of the class described comprising a body part having an eye forming part at one edge thereof, said eye part being parallel to the body part and of the same length as the body part, an angularly disposed base part at one end of the body part and spaced from the eye part and a projection at the other end of the body part spaced from the eye part whereby, when a nail is passed through the eye part, the head thereof will engage the projection and form a closed space between the projection and the nail to receive a part of the lathing.

In testimony whereof we affix our signatures.

HARRY D. DOUCETT.
GEORGE S. GARDNER.